Oct. 27, 1964    C. A. SHUMWAY    3,153,832

HITCH DEVICE

Filed Dec. 3, 1962

INVENTOR.
CHET A. SHUMWAY.
BY
Willard S. Gowd
ATTORNEY.

3,153,832
HITCH DEVICE
Chet A. Shumway, 8821 N. Central Ave., Phoenix, Ariz.
Filed Dec. 3, 1962, Ser. No. 241,896
3 Claims. (Cl. 24—230.5)

This invention pertains to improvements in a hitch device and is particularly directed to an improved pigtail trailer hitch for demountably interconnecting vehicles and the like.

One of the objects of this invention is to provide an improved hitch device which is universal in application.

Another object of this invention is to provide an improved hitch device which may be used in any position.

A further object is to provide a hitch having no moving parts which may readily receive and release the hitch change.

It is also an object to provide a demountable hitch connecting member that is absolutely safe in any operative position and under any operating conditions.

And a still further object is to provide a pigtail hitch device which may be used adjacent a flat plate while allowing full access for connecting and disconnecting the hitching chain while maintaining the full rated load capacity for the hitch.

Further features and advantages of this invention will appear from a detailed description of the drawings in which.

Figure 1:
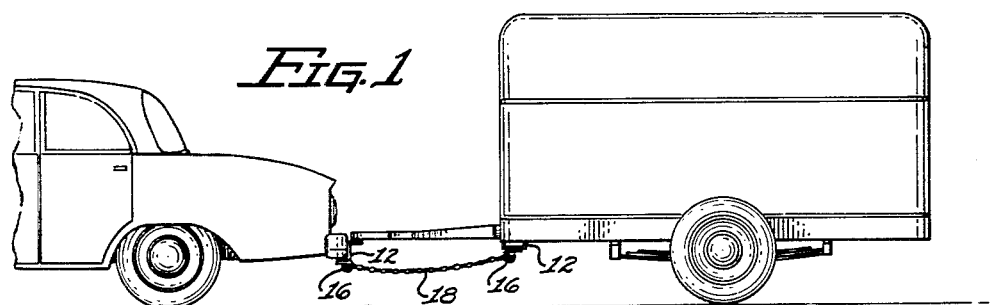
FIG. 1 is a general view showing the use of the hitch for safety chains for a trailer.

As an example of one embodiment of this invention there is shown a hitch device comprising a mounting shank 10 which may be appropriately fixed to the surface 11 of the frame 12 of a trailer or other vehicle as by welding at 13. Formed integral with and extending from the front portion 14 of the shank 10 to the position 15 is the main hook or hitch portion 16 which receives the hitching ring 17 to which is connected the usual chain 18 carrying the load.

Figure 3:
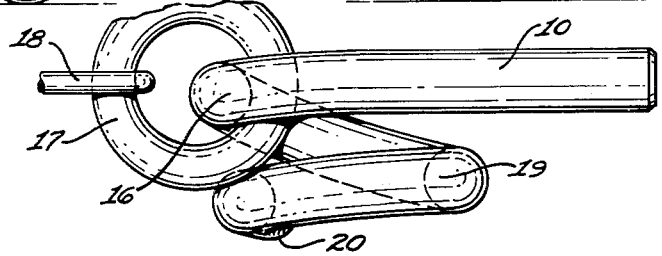
FIG. 3 is a plan view of the hitch of FIG. 2.
Figure 2:
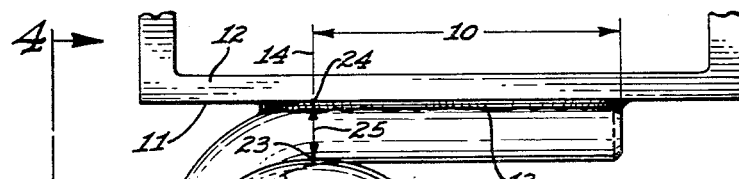
FIG. 2 is an enlarged side elevation of the trailer hitch.
Figure 4:
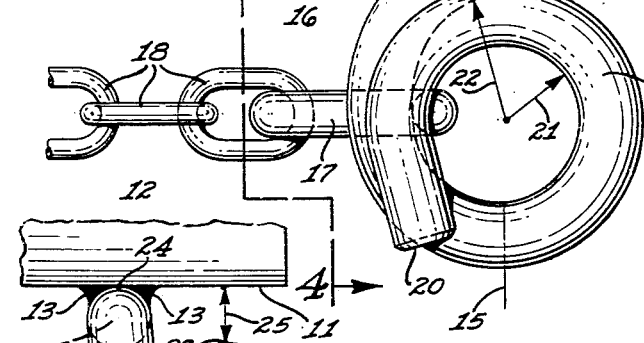
FIG. 4 is an end elevation of the hitch shown in FIG. 2, indicated by the line 4—4.

Beyond the position 15 is the integral pigtail portion 19 terminating at the end 20. It is important to note that the radius 21 in the opening of the pigtail 19 is less than the radius 22 of the main hitch portion. Further, it will be noted that the top outside surface 23, as shown in FIGS. 2 and 4, is located below the top mounting surface 24 of the shank 10 by a distance 25 equal to at least the thickness 26 of the hitching ring 17. By this arrangement the ring 17 may be hooked or unhooked over the pigtail 19 without interference with the large flat surface 11 to which the hitch device is fixed. The pigtail 19 is offset axially of the main hitch portion in open coil by a spacing 27 at least equal to the thickness 26 of the hitching ring 17 so that in operative position, as best shown in FIGS. 3 and 4, the main hitch portion 16 provides the sole load carrying element of the hitch device.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A hitch device including a hitching ring comprising in combination:
    (a) a mounting shank having a top mounting surface,
    (b) a main hitch portion formed integral with the front portion of said shank curving downwardly and rearwardly therefrom adapted to receive said hitching ring,
    (c) a pigtail portion formed integral with said main hitch portion offset axially thereof to define a space at least the thickness of said hitching ring and curving upwardly and forwardly therefrom and then downwardly with the end of said pigtail portion located substantially at the bottom of said main hitch portion so as to laterally confine said hitching ring laterally on said main hitch portion,
    (d) the radius of curvature of said pigtail opening being less than that of said main hitch portion.

2. A hitch device including a hitching ring comprising in combination:
    (a) a mounting shank having a top mounting surface,
    (b) a main hitch portion formed integral with the front portion of said shank curving downwardly and rearwardly therefrom adapted to receive said hitching ring,
    (c) a pigtail portion formed integral with said main hitch portion offset axially thereof to define a space at least the thickness of said hitching ring and curving upwardly and forwardly therefrom and then downwardly with the end of said pigtail portion located substantially at the bottom of said main hitch portion so as to laterally confine said hitching ring laterally on said main hitch portion,
    (d) the radius of curvature of said pigtail opening being less than that of said main hitch portion,
    (e) and the top outside surface of said pigtail being located below the top surface of said mounting shank.

3. A hitch device including a hitching ring comprising in combination:
    (a) a mounting shank having a top mounting surface,
    (b) a main hitch portion formed integral with the front portion of said shank curving downwardly and rearwardly therefrom adapted to receive said hitching ring,
    (c) a pigtail portion formed integral with said main hitch portion curving upwardly and forwardly therefrom and then downwardly with the end of said pigtail portion located substantially at the bottom of said main hitch portion so as to laterally confine said hitching ring laterally on said main hitch portion,
    (d) the radius of curvature of said pigtail opening being less than that of said main hitch portion,
    (e) the top outside surface of said pigtail being located below the top surface of said mounting shank,
    (f) and said pigtail being offset axially of said main hitch portion in open coil spacing,
    (g) said space between said top outside surface of said pigtail and said top surface of said mounting shank and said open coil spacing being equal to at least the thickness of the hitch ring of a chain to be connected to said hitch device.

References Cited in the file of this patent
UNITED STATES PATENTS

| | | |
|---|---|---|
| 600,548 | Moehn | Mar. 15, 1898 |
| 1,214,717 | Schmidt | Feb. 6, 1917 |
| 1,426,176 | Gardner | Aug. 15, 1922 |
| 2,016,756 | Taylor | Oct. 8, 1935 |
| 2,442,243 | Lloyd | May 25, 1948 |